United States Patent
Marumo et al.

(10) Patent No.: US 7,314,575 B2
(45) Date of Patent: Jan. 1, 2008

(54) MANUFACTURING METHOD OF GLASS SUBSTRATE FOR MAGNETIC DISK, AND MANUFACTURING METHOD OF MAGNETIC DISK

(75) Inventors: Yoshinori Marumo, Tokyo (JP); Intanon Sitalaphruek, Amphur Muang (TH)

(73) Assignees: Hoya Corporation, Tokyo (JP); Hoya Glass Disk (thailand) Ltd., Lamphun (TH)

( * ) Notice: Subject to any disclaimer, the term of this patent is extended or adjusted under 35 U.S.C. 154(b) by 48 days.

(21) Appl. No.: 11/237,868

(22) Filed: Sep. 29, 2005

(65) Prior Publication Data

US 2006/0070980 A1    Apr. 6, 2006

(30) Foreign Application Priority Data

Sep. 29, 2004    (JP) .............................. 2004-283125

(51) Int. Cl.
*B44C 1/22*    (2006.01)

(52) U.S. Cl. ............................ 216/89; 216/90; 216/91; 216/103; 216/107; 216/109; 438/693

(58) Field of Classification Search ................ 438/693; 216/89, 90, 91, 103, 107, 109
See application file for complete search history.

(56) References Cited

U.S. PATENT DOCUMENTS 6,568,995 B1 * 5/2003 Mitani et al. ................. 451/36

2003/0232173 A1 * 12/2003 Saito et al. .................. 428/141
2004/0093803 A1 * 5/2004 Ito et al. ........................ 51/309
2004/0161576 A1 * 8/2004 Yoshimura ................. 428/65.3
2004/0194508 A1 * 10/2004 Nishimoto et al. .......... 65/33.1

FOREIGN PATENT DOCUMENTS

| JP | 2002-109727 A | 4/2002 |
| JP | 2003-348338 A | 12/2003 |
| JP | 2004-59419 A | 2/2004 |

* cited by examiner

*Primary Examiner*—Binh X. Tran
(74) *Attorney, Agent, or Firm*—Sughrue Mion, PLLC

(57) ABSTRACT

A method for manufacturing a glass substrate for a magnetic disk comprises mirror surface polishing and cleaning of a glass substrate, wherein polishing agent of which the principal component is rare-earth oxide with content of fluorine 5% by weight or less, is supplied to the glass substrate, the surface of the glass substrate is subjected to mirror surface polishing by relatively moving the polishing cloth and the glass substrate, then this glass substrate is brought into contact with a cleaning solution including ascorbic acid, fluorine ion, and sulfuric acid of 3% by weight or more, and the polishing agent is dissolved and removed. The concentration of the ascorbic acid included in the cleaning solution is 0.1% by weight or more, and the content of the fluorine ion is 1 ppm to 40 ppm. At least a magnetic layer is formed on the obtained glass substrate to manufacture a magnetic disk.

14 Claims, No Drawings

MANUFACTURING METHOD OF GLASS SUBSTRATE FOR MAGNETIC DISK, AND MANUFACTURING METHOD OF MAGNETIC DISK

This application claims priority to prior Japanese patent application JP 2004-283125, the disclosure of which is incorporated herein by reference.

BACKGROUND OF THE INVENTION

The present invention relates to a method for manufacturing a magnetic disk to be mounted on a magnetic disk device such as a hard disk drive (HDD) or the like, or a method for manufacturing a glass substrate for a magnetic disk.

A magnetic disk is known as one of recording media for information processing equipment and is widely used for a hard disk drive (HDD). Such a magnetic disk has a substrate and a thin film such as a magnetic layer and the like on a substrate. As the substrate, an aluminum substrate has been employed. However, recently, in order to respond to the demand for increased recording density, recent tendency is that glass substrates have been widely used instead of the aluminum substrates because a spacing between the magnetic head and the magnetic disk can be narrowed in the glass substrates as compared with aluminum substrates. Also, each surface of the glass substrates is precisely polished, which makes it possible to realize high recording density and to lower a flying height of the magnetic recording head as low as possible.

As described above, high smoothness of the magnetic disk surface is required and indispensable for lowering a flying height (flying amount) necessary for realizing high recording density. In order to obtain high smoothness of the magnetic disk surface, requirement is directed to high smoothness of the substrate surface. However, realizing high recording density on the magnetic disk has become difficult now only by simply polishing the substrate surface in high precision. That is to say, no matter how much the substrate surface is polished, high smoothness cannot be obtained when a foreign object is adhered on the substrate. Of course, removal of foreign objects has been performed conventionally, but the technology has reached a state wherein foreign objects conventionally neglected or allowed on the substrate are recognized as a problem in today's high-density requirements.

The glass substrate having high smoothness can be obtained by fine polishing by the use of a cerium oxide polishing agent. However, after the polishing process using a cerium oxide polishing agent, foreign objects which are protruded often remain without being removed with a normal cleaning process. This results in a problem wherein the surface roughness thereof cannot be reduced. The protruded foreign objects are frequently formed by polishing abrasives remaining on the substrate.

As for a technique for removing the protruded foreign objects formed by adhered cerium oxide abrasives, with the technology field of glass substrates for a information recording medium, for example, performing sulfate cleaning after polishing with cerium oxide abrasives has been proposed (see Japanese Unexamined Patent Application Publication (JP-A) No. 2000-348338). Further, for example, with the technology field such as information recording media, liquid crystal or organic EL displays, photo-masks, and the like, a technique for cleaning the glass substrate with cleaning chemical solution including three components of acid, reducer, and fluorine ion, has been proposed (see Japanese Unexamined Patent Application Publication (JP-A) No. 2004-059419).

Recently, with hard disk drives (HDD), information recording density of 60 gigabits/inch$^2$ is demanded. This relates to a phenomenon wherein, in addition to needs for conventional computer storage drives, hard disk drives have been mounted in cellular phones, navigation systems, digital cameras, and so forth.

In such new applications, the chassis space for mounting a hard disk drive is markedly small as compared with computers, so hard disk drives need to be reduced in size. To this end, the diameter of a magnetic disk to be mounted on a hard disk drive needs to be reduced in size. For example, with computer applications, 3.5 inch or 2.5 inch magnetic disks have been able to be employed, but with the above new application, smaller diameter magnetic disks than those, such as 0.8 inch through 1.8 inch for example, are employed. Thus, even with a case of reducing magnetic disks in size, information capacity of a predetermined level or more should be increased, which accelerates augmentation of information recording density.

Also, in order to use a restricted disk area more effectively, hard disk drives employing an LUL (Load/Unload) method have been employed instead of hard disk drives employing the conventional CSS (Contact Start and Stop) method. With the LUL method, when a hard disk drive is stopped, the magnetic head thereof is evacuated to a tilting table called a ramp, positioned outside of the magnetic disk, and when the hard disk drive is activated, following the magnetic disk starting rotations, the magnetic head is slid on the magnetic disk from the ramp, and is subjected to flying flight to perform recording and reproduction. When the hard disk drive is stopped, the magnetic head is evacuated to the ramp outside of the magnetic disk, and then rotation of the magnetic disk is stopped. These series of movements are called LUL movements. With the magnetic disks for a hard disk drive employing the LUL method, a contact sliding region (CSS region) as to the magnetic head needs not to be provided unlike the CSS method, and a recording/reproducing region can be enlarged, which is preferable for realizing increase of information capacity.

In order to improve information recording density under such a situation, spacing losses need to be infinitely reduced by decreasing the flying amount of the magnetic head. In order to achieve information recording density of 60 gigabits/inch$^2$ or more, the flying amount of the magnetic head needs to be reduced to 10 nm or less. With the LUL method unlike the CSS method, a convex/concave shape for the CSS method needs not to be provided on the magnetic disk surface, resulting in readily realizing smoothness on the magnetic disk surface. Accordingly, with the magnetic disk employing the LUL method, the flying amount of the recording head can be further decreased as compared with that employing the CSS method, and increase in S/N ratio of recording signals can be realized, which contributes to realization of high recording capacity of the magnetic disk device.

Due to further decrease of the flying amount of the magnetic head according to introduction of the recent LUL method, even with extremely low flying amount of 10 nm or less, stable movements of the magnetic disk have been demanded. However, upon the magnetic head being subjected to flying over the magnetic disk surface with such an extremely low flying amount, a problem has resulted wherein a fly-stiction frequently occurs. Fly-stiction is a malfunction wherein the flying attitude of the magnetic head suddenly becomes unstable during recording/reproducing, causing abnormal fluctuation in recording signals and reproducing signals. This fly-stiction especially readily occurs with the magnetic head which performs flying with an NPAB (negative pressure air bearing surface) slider, i.e., a negative pressure slider. The magnetic head including a negative pressure slider has an advantage wherein stable flying flight can be performed even at low flying amount of 10 nm or less, but this causes strong negative pressure upon the magnetic head undersurface (i.e., surface facing the magnetic disk). Accordingly, this makes for a situation wherein fly-stiction readily occurs.

Further, with the flying amount of the magnetic head reaching 10 nm or less, with the magnetic head on which a magneto-resistance effect-type reproducing device, e.g., a TMR (tunneling magneto-resistance) type reproducing device is mounted, a problem is created in that thermal asperity readily occurs. Upon thermal asperity occurring, the error rate drastically deteriorates, and it is hard to perform recording/reproducing of information with a predetermined recording density, e.g., 60 gigabits/inch$^2$ or more, for example.

In light of these situations, the present inventor has attempted to develop a magnetic disk, and a glass substrate for a magnetic disk, which can perform safely recording/reproducing without crashing, fly-stiction, and thermal asperity, even in the event of the magnetic head flying within 10 nm. For example, the present inventor has attempted to remove adhered polishing agent in a precise manner, by refining polishing abrasives to perform accurate mirror polishing process, and then preparing a cleaning chemical solution in a subsequent cleaning process. For example, the present inventor has used various cleaning techniques including cleaning that utilizes the techniques of the above Japanese Unexamined Patent Application Publication (JP-A) No. 2000-348338, and Japanese Unexamined Patent Application Publication (JP-A) No. 2004-059419, but has found out that these problems cannot be always prevented in a sure manner.

SUMMARY OF THE INVENTION

The present invention has been made to solve these problems, and a first object thereof is to provide a method for manufacturing a glass substrate for a magnetic disk particularly useful in a case of manufacturing a magnetic disk for subjecting the magnetic head to flying flight with a low flying amount such as a flying amount of 10 nm or less, or a method for manufacturing a magnetic disk using the glass substrate manufactured by the above manufacturing method.

A second object of the present invention is to provide a method for manufacturing a glass substrate for a magnetic disk particularly useful in a case of manufacturing a magnetic disk for reproducing recorded information with a magnetic head on which a magneto-resistance effect-type reproducing device, in particular, a TMR (tunneling magneto-resistance reproducing device is mounted, or a method for manufacturing a magnetic disk using the glass substrate manufactured by the above manufacturing method.

A third object of the present invention is to provide a method for manufacturing a glass substrate for a magnetic disk particularly useful in a case of manufacturing a magnetic disk to be mounted on a hard disk drive for performing starting/stopping movements using the load/unload method, or a method for manufacturing a magnetic disk using the glass substrate manufactured by the above manufacturing method.

A fourth object of the present invention is to provide a method for manufacturing a glass substrate for a magnetic disk particularly useful in a case of manufacturing a magnetic disk to be recorded/reproduced with high information recording density of 60 gigabits/inch$^2$ or more, or a method for manufacturing a magnetic disk using the glass substrate manufactured by the above manufacturing method.

The present inventor, in order to solve the above problems, has observed the surface of a glass substrate for a magnetic disk which was subjected to mirror surface polishing using a cerium oxide polishing agent, and then cleansed with a cleaning solution including acid such as sulfuric acid and the like, in detail using an atomic force microscope or an electron microscope. In particular, upon a minute rectangular region of which one side is 5 μm being enlarged and observed carefully, with the glass substrate surface following cleaning, the present inventor found that a small hole (recessed portion) is opened wherein the opening portion thereof is around 0.1 through 0.5 μm in size, and is around 6 nm through 8 nm in depth. Protruding foreign objects have not been observed on this glass substrate, so adhered polishing abrasives are assumed to have been generally removed, but a minute recessed portion has been formed. Conventionally, with a glass substrate for a magnetic disk, focus has been put on removal of protruding foreign objects which adversely affect the magnetic head to be subjected to upward flying flight. A recessed shape has not been encountered with the upper magnetic head, so this shape has not been seen as a problem at all. The present inventor has felt strongly that this recessed shape causes the above problems. This is because the present inventor has considered that the flying amount of the magnetic head further decreases as compared with the conventional flying amount, and accordingly, a recessed portion, which has not conventionally been seen as a problem, adversely affects the magnetic disk.

Consequently, the present inventor has performed research focusing on in that first, the mirror surface state of the glass substrate surface subjected to mirror surface polishing is to be maintained, second, protruding foreign objects (protruding portions) formed by a polishing agent being adhered are to be removed in a sure manner, and third, in the event that the magnetic head passes through upward with a low flying amount of 10 nm or less, opening portions (recessed portions) which adversely affects the magnetic head are not to be formed, and has completed the present invention.

The present invention has the following structures.

Structure 1

A method for manufacturing a glass substrate for a magnetic disk and comprising a mirror polishing process of a glass substrate and a cleaning process of the glass substrate, wherein the mirror polishing process comprises the steps of applying, on the glass substrate, a polishing agent which includes rare-earth oxide as a main component and 5% or less of fluorine by weight; and mirror polishing the surface of said glass substrate by relatively moving a polishing cloth and said glass substrate, the cleaning process comprising the steps of contacting the glass substrate subjected to the mirror polishing step with a cleaning solution which includes ascorbic acid, fluorine ion, and 3% by weight or more of sulfuric acid; and removing said polishing agent from the glass substrate by dissolving the polishing agent in the cleaning solution.

Here, the term "content of fluorine" means the content of fluorine atoms included in a polishing agent. Fluorine atoms are included as fluorine substances (fluoride and/or fluorine) within a polishing agent.

In the Structure 1, the concentration of sulfuric acid included in a cleaning solution is preferably 4% by weight or more, and also preferably 10% by weight or less.

Structure 2

The method for manufacturing a glass substrate for a magnetic disk according to Structure 1, wherein the concentration of the ascorbic acid included in said cleaning solution is 0.1% by weight or more.

The concentration of ascorbic acid included in a cleaning solution is preferably 0.5% by weight or more, and also preferably 3% by weight or less.

Structure 3

The method for manufacturing a glass substrate for a magnetic disk according to Structure 1 or 2, wherein the content of the fluorine ion included in said cleaning solution falls within a range between 1 ppm and 40 ppm.

The content of fluorine ion included in a cleaning solution is preferably 3 ppm or more but 20 ppm or less.

Structure 4

The method for manufacturing a glass substrate for a magnetic disk according to any one of Structures 1 to 3, wherein said glass substrate is formed by amorphous aluminosilicate glass which includes, by weight, 58% to 75% of $SiO_2$, 5% to 23% of $Al_2O_3$, 3% to 10% of $Li_2O$, and 4% to 13% of $Na_2O$, as principal components.

Structure 5

The method for manufacturing a glass substrate for a magnetic disk according to any one of Structures 1 to 4, wherein the surface of said glass substrate after said cleaning process has a mirror surface of which the maximum valley depth Rv is 4 nm of less.

The mirror surface preferably has the maximum roughness Rmax of 6 nm or less.

Structure 6

A method for manufacturing a magnetic disk wherein at least a magnetic layer is formed on the glass substrate manufactured by the method for manufacturing the magnetic disk according to any one of Structures 1 to 5.

Structure 7

The method for manufacturing a magnetic disk according to Structure 6, wherein a magnetic disk for recording and reproducing information has bit recording density of 60 gigabits/$inch^2$ or more.

Note that with the present invention, the Rmax means the maximum roughness to be calculated in conformity to Japanese Industrial Standards (JIS) B0601, in the event that the average surface of surface roughness (i.e., surface shape) is set as a reference surface, the Rmax is aggregation of the absolute value of a height up to the highest peak as viewed from the reference surface (referred to as the maximum peak height Rp), and the absolute value of a depth up to the deepest valley as viewed from the reference surface (referred to as the maximum valley depth Rv). That is to say, the Rmax can be calculated as Rmax=Rp+Rv. Also, with the present invention, the term "surface roughness" (e.g., the maximum roughness is the Rmax, the maximum peak height is the Rp, the maximum valley depth is the Rv, and the arithmetic average roughness is Ra) is preferably the surface roughness in a surface shape obtained in the event of measurement using an atomic force microscope (AFM). For example, this is preferably the surface roughness in a surface shape in the event of measuring a square region of 5 μm×5 μm on the surface of a substrate.

According to a first aspect of the present invention, a method for manufacturing a glass substrate for a magnetic disk comprises mirror polishing process and cleaning process of the glass substrate. In the mirror polishing process, use is made about a polishing agent of which the principal component is rare-earth oxide and in which the content of fluorine is 5% by weight or less. The polishing agent is supplied to the glass substrate and, thereafter, the surface of the glass substrate is subjected to mirror surface polishing by relatively moving a polishing cloth and the glass substrate. Subsequently, the glass substrate is brought into contact with a cleaning solution including ascorbic acid, fluorine ion, and sulfuric acid of 3% by weight or more, and the polishing agent is dissolved and removed. With the glass substrate surface after cleaning, recessed portions are not formed which adversely affect the magnetic head subjected to flying flight with a flying amount of 10 nm or less, for example while protrusions formed by the polishing agent being adhered are removed, and the glass substrate surface is also a mirror surface. This makes it possible to prevent head crashes, thermal asperity, and fly-stiction, with the magnetic disk manufactured using this glass substrate.

Accordingly, the present invention can provide a method for manufacturing a glass substrate for a magnetic disk particularly useful in a case of manufacturing a magnetic disk for reproducing recorded information using a magnetic head on which a magneto-resistance effect-type reproducing device, particularly a TMR (tunneling magneto-resistance) type reproducing device is mounted, or a method for manufacturing a magnetic disk which utilizes a glass substrate manufactured by the above manufacturing method. Also, the present invention can provide a method for manufacturing a glass substrate for a magnetic disk particularly useful in a case of manufacturing a magnetic disk to be mounted on a hard disk drive for performing starting/stopping movements using the load/unload method, or a method for manufacturing a magnetic disk using the glass substrate manufactured by the above manufacturing method. Also, the present invention can provide a method for manufacturing a glass substrate for a magnetic disk particularly useful in a case of manufacturing a magnetic disk to be recorded/reproduced with high information recording density of 60 gigabits/$inch^2$ or more, or a method for manufacturing a magnetic disk using the glass substrate manufactured by the above manufacturing method.

Further, the present invention can provide a method for manufacturing a glass substrate for a magnetic disk particularly useful in a case of manufacturing a magnetic disk for reproducing recorded information with a magnetic head for performing flying with an NPAB slider, i.e., a negative pressure slider, or a method for manufacturing a magnetic disk using the glass substrate manufactured by the above manufacturing method.

DESCRIPTION OF THE PREFERRED EMBODIMENT

Description will be made below regarding an embodiment of the present invention.

The present inventor made various kinds of cleaning reagents, compared performance of solutions as to cerium oxide (cerium dioxide) serving as a principal component of a polishing agent, and found that appropriate performance of solution can be obtained as to a processing solution including sulfuric acid and ascorbic acid. In particular, upon fluorine ion being supplied by further adding hydrofluoric acid or sodium fluoride as an additive to the processing solution including sulfuric acid and ascorbic acid, the present inventor confirmed that rapid performance of solution can be obtained. The present inventor confirmed performance of solution as to rare-earth oxide such as lanthanum oxide, praseodymium oxide, neodymium oxide, and the like other than cerium oxide, and found that the same performance of solution as that of cerium oxide can be obtained. Actually, when the present inventor subjected a glass substrate to mirror surface polishing with a polishing solution including cerium oxide polishing agent, following which cleansed the glass substrate with a cleaning solution including sulfuric acid, ascorbic acid, and fluorine ion, the present inventor was able to remove protrusions (protruding portions) formed by the polishing agent being adhered to the glass substrate regardless of the concentration of sulfuric acid.

However, when the present inventor observed the surface thereof in detail with an atomic force microscope, in the event of bringing the glass substrate into contact with a cleaning solution of which the concentration of sulfuric acid is lower than a predetermined concentration, the present inventor discovered that small holes (recessed portions) are opened on the glass substrate surface. Specifically, in the event that the concentration of sulfuric acid is less than 3% by weight, the present inventor found that recessed portions are formed on the glass substrate surface. With a cleaning solution belonging to a system wherein sulfuric acid, ascorbic acid, and fluorine ion coexist, in the event that the concentration of sulfuric acid is less than 3% by weight, sulfuric acid causes leaching from the glass, and roughens the surface roughness by deforming the surface thereof, which can be conceived. Note that the term "leaching" means a phenomenon wherein with multi-component glass such as aluminosilicate glass and the like, substance fusible to acid included in the glass is dissolved out while maintaining the skeleton portion (SiO skeleton) of the glass. Leaching is a phenomenon markedly occurring with multi-component glass including elements other than SiO. Leaching is a phenomenon different from etching wherein the glass itself is dissolved.

Accordingly, in order to solve the problems of the present invention by preventing recessed portions on the glass substrate surface from formation, the present inventor found that sulfuric acid needs to exceed at least 1.5% by weight, preferably 3% by weight or more with a cleaning solution belonged to a system wherein sulfuric acid, ascorbic acid, and fluorine ion coexist.

Further, when subjecting the glass substrate to cleaning using this cleaning solution, the present inventor found that the forms of protruding portions and recessed portions generated on the glass substrate differ depending on the type of cerium oxide polishing agent. Many types of cerium oxide polishing agents used for mirror surface polishing of a glass substrate exist depending on the manufacturing method thereof, and others. Also, with a cerium oxide polishing agent, cerium oxide is a principal component, but other rare-earth oxide other than cerium oxide, for example, lanthanum oxide, praseodymium oxide, neodymium oxide, and the like are included. That is to say, a cerium oxide polishing agent is a rare-earth oxide polishing agent including cerium oxide as a principal component.

At the present (as of the year 2004), cerium oxide polishing agents, which are available, are classified into two types of a cerium oxide polishing agent which is manufactured by performing processing such as baking and the like with bastnaesite ores including fluorine substance as raw materials, and a cerium oxide polishing agent which is manufactured by performing processing such as baking and the like with a refined rare-earth compound as a raw material. The former cerium oxide polishing agent principally includes fluorine in a form of rare-earth fluoride since a raw material ore itself includes fluorine substance. On the other hand, the latter cerium oxide polishing agent includes no fluorine, or includes a minute amount of fluorine even if fluorine is included. Note that the content of fluorine within a polishing agent can be measured as the content of fluorine atoms using the XPS (X-ray photoelectron spectroscopy analysis method) or the like.

Comparison was made regarding performance of cleaning of a cleaning solution according to the present invention in a system wherein sulfuric acid (however, the concentration of sulfuric acid is 3% by weight or more), ascorbic acid, and fluorine ion coexist, as to cerium oxide polishing agents including various contents of fluorine, and the present inventor found that with a polishing agent of which content of fluorine exceeds a predetermined content, protruding portions generated on the glass substrate surface cannot be removed in a predetermined manner. With a polishing agent of which content of fluorine exceeds a predetermined content, the present inventor also found that recessed portions are formed in some cases.

From this perspective, in the event of cleaning a glass substrate for a magnetic disk using a cleaning solution according to the present invention, the present inventor found out that a cerium oxide polishing agent (i.e., rare-earth oxide polishing agent) adhered to the surface thereof needs to include no fluorine, or include fluorine of which content is 5% by weight or less even with a fluorine polishing agent.

With a cerium oxide polishing agent including much content of fluorine, a lot of rare-earth fluoride such as cerium fluoride is included other than rare-earth oxide such as cerium oxide. When the glass substrate is brought into contact with a cleaning solution including sulfuric acid, cerium fluoride and sulfuric acid are principally reacted to generate cerium sulfate, which can be conceived. On the other hand, a reaction for generating water and cerium sulfate by cerium oxide and sulfuric acid being reacted is performed in parallel, but moderately, the reaction for generating hydrofluoric acid and cerium sulfate by cerium fluoride and sulfuric acid being reacted is conceived to have an advantage. That is to say, in the event that a rare-earth oxide polishing agent includes fluorine exceeding a predetermined amount, solution of rare-earth oxide serving as a principal component of a polishing agent is obstructed by the reason wherein reaction is generated between rare-earth fluoride serving as an impurity and sulfuric acid, and the like. Accordingly, protruding portions generated by the polishing agent being adhered on the glass substrate are conceived not to be removed appropriately.

Also, as a result of the reaction between rare-earth fluoride and sulfuric acid, hydrofluoric acid is generated within the cleaning solution, but fluorine ion concentration in the cleaning is disturbed by the generated hydrofluoric acid, and accordingly, the concentration is in danger of increase as compared with a desired concentration. Further, when hydrofluoric acid is generated in the vicinity of the interface between the polishing agent adhered to the glass substrate and the glass, the glass substrate surface is in danger of subjecting to etching (generation of a recessed portion) at a minute region by the generated hydrofluoric acid.

With the present invention, a low fluorine polishing agent of which content of fluorine is 5% by weight is employed, whereby a glass substrate in a mirror surface shape can be manufactured without causing the above problems, and without generating protruding portions and recessed portions.

With the present invention, in the event that the concentration of sulfuric acid included in the cleaning solution of a glass substrate is set to 3% by weight, recessed shapes can be prevented from generation on the glass substrate surface, but for example, from the perspective that the dissolving rate of a polishing agent and manufacturing efficiency are desired to be improved, the concentration of sulfuric acid can be practically set to 4% by weight or more. Also, the more the concentration of sulfuric acid increases, the more manufacturing efficiency improves, but exceeding 30% by weight is not preferable since the dissolving rate of cerium oxide decreases in some cases. From this perspective, the concentration of sulfuric acid is preferably set to 30% by weight or less. Further, in the event of a fluorine cerium oxide polishing agent, as described above, reaction occurs between rare-earth fluoride and sulfuric acid, so excessively increasing the concentration of sulfuric acid is not preferable. From this perspective, the concentration of sulfuric acid is 30% by weight or less, preferably 10% by weight or less.

With the present invention, ascorbic acid included in the cleaning solution of a glass substrate may be substituted with L-ascorbic acid. This may be supplied as the salt of L-ascorbic acid. The concentration of ascorbic acid included in the cleaning solution can be adjusted within a range wherein predetermined performance of solution as to a polishing agent can be maintained, for example, the concentration of 0.1% by weight or more. In the event that the concentration is less than 1% by weight, the dissolving rate of a polishing agent is slow, and accordingly, manufacturing efficiency is deteriorated in some cases. When considering manufacturing velocity, the concentration is 0.5% by weight or more, preferably 1% by weight or more. The upper limit value of the concentration of ascorbic acid needs not to be restricted to any value, but practically 4% by weight or less is preferable. However, the vicinity of 4% by weight is close to the saturated concentration of ascorbic acid, so making up a cleaning solution is practically difficult. Accordingly, when considering manufacturing efficiency, 3% by weight or less is preferable. In the vicinity of 3% by weight, a cleaning solution is rapidly made up, thereby improving manufacturing efficiency.

With the present invention, fluorine ion included in the cleaning solution of a glass substrate is preferably supplied by adding hydrofluoric acid or sodium fluoride to the cleaning solution. In particular, employing hydrofluoric acid is preferable. The concentration of fluorine ion can be adjusted in a predetermined manner within a range wherein the operation of the present invention is obtained, but is preferably 1 ppm or more. When the concentration of fluorine ion is less than 1 ppm, the dissolving rate of the cleaning solution as to a polishing agent is slow, and accordingly, which deteriorates manufacturing efficiency, and also in some cases, dissolving performance as to the polishing agent is insufficient. From this perspective, in particular, the concentration of fluorine ion is preferably set to 3 ppm or more. Also, the upper limit value of the concentration of fluorine ion is recommended to be set to 40 ppm or less, preferably 20 ppm or less. When exceeding 40 ppm, the dissolving rate of the cleaning solution as to the polishing agent is slow, and accordingly, which deteriorates manufacturing efficiency, and also in some cases, dissolving performance as to the polishing agent is insufficient. Also, when exceeding 40 ppm, etching of the glass substrate is in danger of occurring. When etching occurs upon the glass substrate, the degree of roughness on the mirror surface polishing surface of the glass substrate increases, and also the surface of the glass substrate is in danger of formation of protruding shapes and recessed shapes thereupon.

Note that with a fluorine cerium oxide polishing agent, as described above, hydrofluoric acid is generated by the reaction between rare-earth fluoride and sulfuric acid included in the cleaning solution. Accordingly, with the present invention, the concentration of sulfuric acid needs to be managed within a ppm level. In particular, when fluorine included in the polishing agent exceeds 5% by weight, managing the concentration of fluorine ion within the cleaning solution is difficult in some cases.

With the present invention, the polishing agent to be used for mirror surface polishing of a glass substrate is not restricted to a particular agent as long as the polishing agent of which the principal component is rare-earth oxide of which the content of fluorine is 5% by weight or less. In particular, a cerium oxide polishing agent including cerium oxide as a principal component is preferably employed. Here, the polishing agent of which the principal component is rare-earth oxide of which the content of fluorine is 5% by weight or less means a polishing agent of which a principal component is rare-earth oxide including no fluorine, or including fluorine of 5% by weight or less even with a fluorine polishing agent. Also, the term "content of fluorine" means the content of fluorine atoms included in the polishing agent. Fluorine atoms are included in the polishing agent as fluorine substance (fluoride and/or fluorine). In the event of including fluorine within the polishing agent, the content of fluorine is preferably set to 3% by weight or less.

The method of mirror surface polishing according to the present invention is not restricted to a particular method, for example, the surface of the glass substrate should be polished in a mirror surface shape by bringing the glass substrate into contact with polishing cloth, and moving the polishing cloth and the glass substrate relatively while supplying a polishing agent. A polishing pad can be employed as polishing cloth. A polishing pad made up of flexible polisher is preferably employed. The hardness of the polishing pad is ASKER C-type hardness, and is preferably 60 or more but 80 or less. The contact surface between the polishing pad and the glass substrate is a foamed resin wherein a foamed pore is opened, preferably foamed polyurethane. The average particle diameter of polishing abrasives (polishing abrasives of which the principal component is cerium oxide in the present invention) included in the polishing agent can be set to 0.1 μm or more but 1 μm or less. Upon polishing being performed thus, the surface of the glass substrate can be polished in a smooth mirror surface shape.

With the present invention, glass making up a glass substrate is preferably amorphous aluminosilicate glass. Such a glass substrate can be finished to a smooth mirror surface by subjecting the surface thereof to mirror surface polishing. As for such aluminosilicate glass, aluminosilicate glass (however, aluminosilicate glass excluding phosphorous acid) including $SiO_2$ of 58% by weight or more but 75% by weight or less, $Al_2O_3$ of 5% by weight or more but 23% by weight or less, $Li_2O$ of 3% by weight or more but 10% by weight or less, and $Na_2O$ of 4% by weight or more but 13% by weight or less as principal components can be employed. For example, amorphous aluminosilicate glass including $SiO_2$ of 62% by weight or more but 75% by weight or less, $Al_2O_3$ of 5% by weight or more but 15% by weight or less, $Li_2O$ of 4% by weight or more but 10% by weight or less, $Na_2O$ of 4% by weight or more but 12% by weight or less, and $Z_rO_2$ of 5.5% by weight or more but 16% by weight or less, as principal components, also having the ratio by weight of $Na_2O/ZrO_2$ of 0.5 or more but 2.0 or less, $Al_2O_3/ZrO_2$ of 0.4 or more but 2.5 or less, but excluding phosphorous acid, can be employed. The glass excluding alkaline earth metal oxide such as CaO and MgO is preferable. An example of such glass is N5 glass (product name) manufactured by HOYA Corp.

With aluminosilicate glass, leaching sometimes occurs by coming into contact with sulfuric acid, and the surface of the glass substrate is sometimes deformed to roughen the surface roughness. The cleaning solution according to the present invention is, as described above, composed in light of these problems, and accordingly is suitable.

With the present invention, the surface of the glass substrate following cleaning process is preferably a mirror surface of which the maximum valley depth Rv is 4 nm or less. When the Rv exceeding 4 nm, i.e., when the depth of a recessed portion is deep, the flying attitude of the magnetic head for performing flying flight with a flying amount of 10 nm or less is sometimes disturbed, and also the magnetic head is in danger of fly-stiction. Further, the mirror surface of which the maximum roughness Rmax is 6 nm or less is preferable. Such a mirror surface state can be realized by performing the mirror polishing process and cleaning process according to the present invention in this order.

With the present invention, the glass substrate is preferably subjected to chemical strengthening processing following the cleaning process according to the present invention. As for a method of the chemical strengthening processing, for example, a low temperature ion exchange method for performing ion exchange at a temperature which does not exceed the glass transition point, e.g., at temperature of 300° C. or more but 400° C. or less, and so forth is preferable. The term "chemical strengthening processing" means processing wherein ion exchange is performed between an alkali metal element having a relatively large atomic radius within chemical strengthening salt and an alkali metal element having a relatively small atomic radius within the glass substrate by bringing melted chemical strengthening salt into contact with the glass substrate, an alkali metal element having a large ion radius is infiltrated in the surface layer of the glass substrate to cause compression stress on the surface of the glass substrate. The glass substrate subjected to chemical strengthening processing excels in crashproof properties, so is particularly preferable for mounting on a mobile HDD. As for chemical strengthening salt, alkali metal nitrate such as potassium nitrate, sodium nitrate, or the like can be preferably employed.

With the surface of the glass substrate according to the present invention, a polishing agent is removed in a sure manner, so uniform compression stress can be brought about on the surface of the glass substrate by performing chemical strengthening processing. When the chemical strengthening processing of the glass substrate is performed without removing the polishing agent sufficiently, the polishing agent is fixed to the glass substrate during a process wherein the glass substrate is subjected to ion exchange processing at temperature of 300 degrees or more centigrade but 400 degrees or less centigrade, which cannot be moved easily. Further, the glass beneath the adhered polishing agent is prevented from generation of compression stress, and accordingly, the portion thereof may be deformed to a protruding shape or a recessed shape. The average particle diameter of the polishing agent to be employed for the mirror polishing process is 0.1 μm through 1 μm, so the shape deformation, i.e., protruding shape deformation or recessed shape deformation in size equivalent thereto is sometimes caused. With the present invention, a polishing agent can be removed in a sure manner, and also the surface of a glass substrate to be subjected to the chemical strengthening processing is a smooth surface in a mirror surface shape without protruding and recessed shapes, so uniform compression stress can be caused even at a minute region. Accordingly, even following the chemical strengthening processing, a smooth surface in a mirror surface shape without protruding and recessed shapes can be maintained.

With the present invention, tape polishing processing can be performed following the cleaning process according to the present invention. With the present invention, the surface of a glass substrate to be subjected to the tape polishing processing is a smooth surface in a mirror surface shape without protruding and recessed shapes, so the surface shape is not in danger of being disturbed by insertion of a foreign object in the tape polishing processing.

Recently, magnetic anisotropy is sometimes applied to the magnetic layer of the magnetic disk in the circumferential direction of the disk to improve the information recording density of the magnetic disk. The circumferential direction of the disk is, that is to say, the movement direction of the magnetic disk, so applying magnetic anisotropy along in this direction contributes to realization of high recording density. Texture can be formed which is made up of streaks oriented in the circumferential direction of the disk by subjecting the surface of the disk-shaped glass substrate to the tape polishing processing. When a magnetic layer is formed on the glass substrate subjected to this texture processing, magnetic anisotropy can be created in the circumferential direction of the disk. With the tape polishing processing of this texture processing, a diamond polishing agent is employed. Texture is formed on the surface of the glass substrate by bringing the polishing tape into contact with the glass substrate, supplying the diamond polishing agent, and relatively moving the polishing tape and the glass substrate. At this time, in the event that a foreign object is adhered to the surface of the glass substrate, or a protruding or recessed shape is formed, the desired texture is prevented from formation. Accordingly, applying predetermined magnetic anisotropy to the magnetic disk is difficult. With the present invention, the surface of a glass substrate is a smooth surface in a mirror surface shape without protruding and recessed shapes, so uniform texture can be formed even at a minute region. Accordingly, the present invention contributes to realization of high recording density of a magnetic disk.

The magnetic disk according to the present invention is manufactured by forming at least a magnetic layer on the glass substrate for a magnetic disk according to the present invention. As for a material of the magnetic layer, CoPt strong magnetic alloy serving as a large hexagonal system in the anisotropy magnetic field can be employed. As for a method for forming the magnetic layer, a method for forming the magnetic layer on the glass substrate can be employed using the sputtering method, for example, the DC magnetron sputtering method. Also, the orientation direction of the magnetic grain of the magnetic layer, and the size of the magnetic grain can be controlled by providing a base layer between the glass substrate and the magnetic layer. For example, the magnetic easy direction of the magnetic layer can be oriented along the magnetic disk surface by employing a cubic base layer such as Cr alloy. In this case, the magnetic disk employing the in-plane magnetic recording method is manufactured. Also, for example, the magnetic easy direction of the magnetic layer can be oriented along the normal line of the magnetic disk surface by employing a hexagonal base layer including Ru and Ti. In this case, a magnetic disk employing the vertical magnetic recording method is manufactured. The base layer can be formed using the sputtering method, as with the magnetic layer.

Also, with the present invention, a protective layer and a lubricant layer are preferably formed in this order above the magnetic layer. As for the protective layer, an amorphous hydride carbonaceous protective layer is preferably employed. For example, the protective layer can be formed using the plasma CVD method. As for the film thickness of the protective layer, 30 Å through 80 Å are preferable. Also, as for the lubricant layer, a lubricant agent having a functional group at the low-end of the principal chain of a perfluoro polyether compound can be employed. In particular, a perfluoro polyether compound having a hydroxyl group at the low-end as a polar functional group is preferably employed as a principal component. The film thickness of the lubricant layer is preferably 5 Å through 15 Å. The lubricant layer can be applied and formed using the dip method.

The magnetic disk according to the present invention is preferably employed as a magnetic disk for a hard disk drive to be mounted on mobile equipment such as a cellular phone, navigation system, digital camera, and so forth. Also, the glass substrate for a magnetic disk is preferably employed as a glass substrate for a magnetic disk.

EXAMPLES

Description will be made below in detail regarding a method for manufacturing a glass substrate for a magnetic disk, and a method for manufacturing a magnetic disk, with reference to examples.

Example 1

A method for manufacturing a glass substrate for a magnetic disk according to an example 1 comprises (1) Rough grinding process, (2) End-face mirror surface polishing process, (3) Lapping process, (4) First polishing process, (5) Second polishing process (principal surface mirror surface polishing process), (6) Cleaning process (cleaning process after mirror surface polishing), and (7) Chemical strengthening process. Description will be made below in detail about each of the above-mentioned processes.

(1) Rough Grinding Process

First, the glass disk molded with the press method was subjected to grinding processing with a relatively rough diamond whetstone. As a glass composite serving as a material, a glass composite including $SiO_2$ of 62% by weight or more but 75% by weight or less, $Al_2O_3$ of 5% by weight or more but 15% by weight or less, $Li_2O$ of 4% by weight or more but 10% by weight or less, $Na_2O$ of 4% by weight or more but 12% by weight or less, and $ZrO_2$ of 5.5% by weight or more but 15% by weight or less as principal components, and also having the ratio by weight of $Na_2O/ZrO_2$ of 0.5 or more but 2.0 or less, $Al_2O_3/ZrO_2$ of 0.4 or more but 2.5 or less, was employed. This glass composite is glass excluding alkali rare-earth metal oxide such as CaO and MgO. Specifically, N5 glass (product name) serving as amorphous aluminosilicate glass manufactured by HOYA Corp. was employed.

Next, the both surfaces of the glass disk were subjected to grinding processing with a diamond whetstone of which grain size is finer than the above whetstone. Thus, the surface roughness of the glass substrate surface is finished to 10 μm or so with the Rmax (measured by JISB0601). Next, a hole is made in the central portion of the glass substrate in a disk shape using a cylindrical whetstone to create a donut-shaped glass substrate.

(2) Mirror Surface Polishing Process of an End Surface

Next, the surface roughness of each end surface of the glass substrate was subjected to mirror surface polishing with 1 μm at the Rmax, and 0.3 μm at the Ra while rotating the glass substrate using brushing polishing. As for a polishing agent, a cerium oxide polishing agent was employed. Subsequently, the surface of the glass substrate was subjected to water cleaning.

(3) Lapping Process

Next, the glass substrate was subjected to lapping processing. This lapping process is for improving dimensional accuracy and shape accuracy. The lapping processing was performed using a lapping tool, and the grain size of abrasives was changed twice with #400 and #1000. More specifically, first, the alumina abrasives in the grain size #400 were employed, the principal surfaces of both surfaces of glass substrate stored in a carrier are subjected to lapping with surface accuracy of 0 through 1 μm, and surface roughness (Rmax) of 6 μm or so by rotating an adducent gear and an abducent gear. Next, the grain size of the alumina abrasives was changed to #1000, lapping was performed, and surface roughness (Rmax) of 2 μm or so was obtained. The glass substrate subjected to the lapping processing was dipped in a neutral detergent cleaning bath, and in a water cleaning bath in this order, and was subjected to cleaning.

(4) First Polishing Process

Next, the glass substrate was subjected to the first polishing process. This first polishing process is for removing scratches and deformation remaining from the above lapping process. This process was performed using a polishing apparatus. More specifically, the first polishing process was performed under the following polishing conditions using a hard polishing pad made up of polyurethane. As for a polishing agent, a cerium oxide agent was employed. The glass substrate subjected to the first polishing process was dipped in a neutral detergent cleaning bath, a deionized water cleaning bath, a deionized water cleaning bath, an IPA (isopropyl alcohol) cleaning bath, and an IPA (steam drying) cleaning bath, in this order, and was subjected to cleaning.

(5) Second Polishing Process (Principal Surface Mirror Surface Polishing Process)

Next, the second polishing process was performed by employing the same polishing apparatus employed in the first polishing process, and changing the polishing pad from the hard polishing pad to a soft polishing pad. The processing performed in this second polishing process is mirror polishing process for finishing the principal surfaces in a smooth mirror surface with the surface roughness Rmax of around 6 nm or less of the principal surfaces while maintaining the flat principal surfaces obtained in the first polishing process. The soft polishing pad of ASKAR C-type hardness 72 was employed as a polishing pad. Also, foamed polyurethane on which foamed pore is opened was employed for the surface of the polishing pad. A polishing solution wherein a cerium oxide polishing agent is dispersed in deionized water was employed. The average particle diameter of the polishing agent was 0.8 μm. Note that the content of fluorine included in this cerium oxide polishing agent was analyzed using the XPS (X-ray photoelectron spectroscopy analysis method), 3% by weight at F (fluorine atoms) was obtained. The surface of the glass substrate was subjected to mirror surface polishing by supplying the polishing solution to the glass substrate, and sliding the polishing pad and the glass substrate.

Next, the cleaning process of the glass substrate subjected to the second polishing process (mirror surface polishing process of each principal surface, namely, principal surface mirror polishing process) was performed as follows. The glass substrate subjected to the second polishing process was stored under water without drying (including sun drying), and conveyed to the next cleaning process still in a wet state. This is because once the glass substrate dries with polishing residuals remaining thereupon, removing the polishing agent is sometimes difficult in the cleaning process.

(6) Cleaning Process (Cleaning Process After Mirror Surface Polishing, Namely, Post-Cleaning Process)

This cleaning process is for removing the polishing agent remaining on the surface of the glass substrate finished in a mirror surface in the mirror surface polishing process and will be called a post-cleaning process hereinafter. The polishing agent needs to be removed without roughening the glass surface finished in the mirror surface. For example, in the event that the polishing agent has etching and leaching effects on glass, the polishing agent roughens the mirror finished glass surface to change the mirror finished glass surface into a mat finished surface. The mat finished substrate cannot reduce the flying amount of the magnetic head sufficiently. Accordingly, the cleaning solution according to the present invention has neither etching nor leaching effects on glass, and is composed as a cleaning solution having selective performance of solution as to a specific polishing agent.

A cleaning solution including sulfuric acid of 4.5% by weight and L-ascorbic acid of 1% by weight was prepared beforehand, and hydrofluoric acid of 10 ppm was added thereto such that the fluorine ion concentration within this cleaning solution becomes 10 ppm. As described above, the cleaning solution in this cleaning process was composed. When the same cerium oxide polishing agent as that employed in the second polishing process (principal surface mirror surface polishing process) was dispersed, the polishing agent was found to be completely dissolved for around four minutes. Also, no etching or leaching problematic to glass (aluminosilicate glass) were found.

Note that with the cleaning solution made up of sulfuric acid and L-ascorbic acid without adding hydrofluoric acid, the dissolving rate of the polishing agent is slow, it takes around 20 minutes until the polishing agent is dissolved. Accordingly, with the present example, cleaning of the glass substrate was determined to be performed with a cleaning solution made up of sulfuric acid, L-ascorbic acid, and hydrofluoric acid.

The glass substrate subjected to the second polishing process (principal surface mirror surface polishing process) was dipped in the above cleaning solution made up of sulfuric acid, L-ascorbic acid, and hydrofluoric acid to perform the cleaning process. The glass substrate was dipped in this cleaning solution for five minutes, and the temperature of the cleaning solution was set to 40° C.

When the surface roughness of a 5 μm×5 μm square region on the principal surface of the glass substrate subjected to this cleaning process was measured with an atomic force microscope (AFM), 4.0 nm at the Rmax, 2.0 nm at the Rp, 2.0 nm at the Rv, and 0.4 nm at the Ra were measured. Also, when the surface thereof was analyzed with an atomic force microscope and an electron microscope, the surface was a mirror surface shape, and no protruding shaped and recessed shaped faults and foreign objects were observed. No residue of the polishing agent was detected.

(7) Chemical Strengthening Process

The glass substrate subjected to the cleaning process was subjected to chemical strengthening processing. The chemical strengthening processing is performed by putting chemical strengthening salt into a chemical strengthening processing bath, and dipping the glass substrate held by a holding member in the dissolved chemical strengthening salt. According to the specific method of the chemical strengthening processing, the chemical strengthening salt wherein potassium nitrate and sodium nitrate are mixed was prepared, this chemical strengthening salt was heated to 400° C. to be dissolved, and the glass substrate subjected to cleaning was preheated to 300° C., and dipped for around three hours. Thus, lithium and sodium in the glass substrate surface layer are substituted with sodium and potassium within the chemical strengthening molten salt respectively by dipping the glass substrate in the chemical strengthening molten salt, thereby subjecting the glass substrate to chemical strengthening. The thickness of the compression stress layer formed on the surface layer of the glass substrate was around 100 μm. The glass substrate subjected to the chemical strengthening processing was subjected to the cleaning and drying processes in order of sulfuric acid cleaning, neutral detergent cleaning, deionized water cleaning, alcohol cleaning, and alcohol steam drying.

Upon the principal surfaces of the glass substrate obtained through the above processes being analyzed using an atomic force microscope and an electron microscope, the principal surfaces were in a mirror surface shape, and no protruding and recessed shaped defects and foreign objects were found. No residue of the polishing agent was detected either. The surface roughness was generally the same as that following the cleaning process.

Thus, the glass substrate for a magnetic disk was manufactured.

(8) Magnetic Disk Manufacturing Process

On both surfaces of the glass substrate for a magnetic disk obtained through the above processes, the first base layer of NiTa, the second base layer of Ru, and a CoCrPtB magnetic layer were formed in order using a DC magnetron sputtering device, and subsequently, a hydride carbonaceous protective layer was formed with film thickness of 40 angstroms using the plasma CVD method, and an alcohol denatured perfluoro polyether lubricant agent was applied and formed with film thickness of 10 angstroms using the dip method, thereby manufacturing a magnetic disk. This magnetic disk is a magnetic disk employing the vertical magnetic recording method.

[HDD Mounting Test]

The obtained magnetic disk was mounted on a hard disk drive (HDD) employing the load/unload method of which the maximum recording density was 60 gigabits/inch$^2$. The flying amount of the magnetic head to be mounted on this hard disk drive was 10 nm, and an NPAB slider (negative pressure slider) was employed as a slider. A magneto-resistance effect-type reproducing device was employed as a reproducing device. Upon a test being performed with this hard disk drive, recording and reproducing were safely performed without any occurrence of head-crashing, thermal asperity, or fly-stiction. Load/unload movements were repeated 600,000 times, with no failure detected.

Example 2

Comparative Example 1

Various cleaning solutions were composed as a cleaning solution at the cleaning process (cleaning process following mirror surface polishing), and performances in cleaning were compared. The composition, behavior, and effects of each cleaning solution are summarized in the following table 1. The same glass substrate for a magnetic disk, and the same magnetic disk manufactured by the same manufacturing method as the example 1 were used except for these points. The evaluation method and so forth are the same as described above.

Comparative Example 2

Next, mirror surface polishing was performed using a fluorine cerium oxide polishing agent of 6% by weight at F (fluorine atoms) in the second polishing process (principal surface mirror surface polishing process). Except for these points, the same glass substrate for a magnetic disk, and the same magnetic disk manufactured by the same manufacturing method as the example 1 were used. The evaluation method and so forth were also the same.

Consequently, performance of solution as to the polishing agent was not sufficient, so upon the glass substrate surface following cleaning being observed using an atomic force microscope and an electron microscope, minute protrusions which were assumed to be residual polishing agent were confirmed on some glass substrates. Also, recessed portions and portions of which the surface roughness was great were found in some spots, which were supposed to be caused by etching due to the residual polishing agent at the minute regions of the glass substrate.

Similarly, upon a test being performed with a fluorine cerium oxide polishing agent of which the content of F (fluorine atoms) was changed variously (5% by weight, 2% by weight, and 1% by weight), we found that the same results as the example 1 can be obtained in the event of 5% by weight or less.

Referential Example

Next, a referential experiment according to the present invention was performed, so description will be added regarding this experiment.

A reagent having the same composition as the cleaning solution employed in the cleaning process (cleaning process following mirror surface polishing) according to the example 1 was composed, and behavior thereof as to aluminosilicate glass was researched. Specifically, the compositions of sulfuric acid and ascorbic acid were the same as those in the cleaning solution according to the example 1, but reagents having various concentrations of fluorine ion were composed by adjusting the additional amount of hydrofluoric acid. Normally, hydrofluoric acid is liquid employed for an etching solution as to glass, so we assumed that we should disclose the concentrations of fluorine ion that do not inhibit the behavior and advantages of the present invention.

TABLE 1

| | composition of cleaning solution | | | effect upon polishing | | | glass surface after cleaning | | | | |
|---|---|---|---|---|---|---|---|---|---|---|---|
| | concentration of sulfuric acid (wt %) | concentration of ascorbic acid (wt %) | concentration of hydrofluoric acid added amount (ppm) | agent polishing agent is soluble | effect upon glass | | maximum valley depth Rv (nm) | maximum peak height Rp (nm) | maximum roughness Rmax (nm) | surface condition | HDD mount test |
| | | | | | glass is leachable | glass is etchable | | | | | |
| Example 1 | 4.5 | 1 | 10 | yes | no | no | 2 | 2 | 4 | mirror surface | no failure |
| Example 2-1 | 3 | 1 | 10 | yes | no | no | same as Example 1 | | | mirror surface | no failure |
| Example 2-2 | 10 | 1 | 10 | yes | no | no | | | | mirror surface | no failure |
| Example 2-3 | 4 | 0.1 | 8 | yes | no | no | | | | mirror surface | no failure |
| Example 2-4 | 4 | 3 | 8 | yes | no | no | | | | mirror surface | no failure |
| Example 2-5 | 5 | 2 | 1 | yes | no | no | | | | mirror surface | no failure |
| Example 2-6 | 5 | 2 | 30 | yes | no | no | | | | mirror surface | no failure |
| Comparative Example 1-1 | 1.5 | 1 | 10 | yes | yes | no | 6 | 2 | 8 | depression formed | fly stiction occurred |
| Comparative Example 1-2 | 4.5 | 0 | 0 | no | no | no | 2 | 8 | 10 | protrusion formed | thermal asperity occurred |

Specifically, reagents of seven standards were composed of which the concentrations of fluorine ion are 1 ppm, 5 ppm, 10 ppm, 30 ppm, 40 ppm, 50 ppm, and 100 ppm. Etching velocity was surveyed by bringing these reagents into contact with aluminosilicate glass having the same composition as with the example 1. Consequently, we found that at the concentration of fluorine ion of 40 ppm or less, the etching velocity was 0.01 nm/min at most, which is essentially no etching, but on the other hand, the etching velocity rapidly increased to 0.1 nm/min at the concentration of 50 ppm, and exceeded 0.5 nm/min at 100 ppm. The etching amount may be maintained in a predetermined amount or less even at 50 ppm or more by strictly managing a period for performing the cleaning process, but this provides difficulty upon process control. Accordingly, from the perspective of maintaining a stable mass production line, the concentration of fluorine ion is preferably set to 40 ppm or less.

Example 3

Next, with the example 1, the glass substrate for a magnetic disk and the magnetic disk subjected to the tape polishing processing were manufactured following the chemical strengthening process and prior to the magnetic disk manufacturing process. The texture made up of streak grooves oriented in the circumferential direction of the disk was formed by subjecting the surface of the disk-shaped glass substrate to the tape polishing processing. Specifically, the minute texture was formed on the surface of the glass substrate by bringing the polishing tape made up of resin fiber cloth into contact with the surface of the glass substrate subjected to the chemical strengthening processing, and rotating the glass substrate while supplying diamond abrasives. Upon the surface of the glass substrate subjected to this texture formation being observed with an atomic force microscope, the surface roughness was the same as that in the example 1, but an exquisite texture shape was formed on the surface thereof. The streaks making up the texture were oriented in the circumferential direction of the disk. Protruding and recessed portions and gouges formed by foreign objects which would disrupt the texture shape were also not detected. Film formation was performed on this glass substrate as with the example 1 to manufacture a magnetic disk. However, the first base layer was substituted with a CrTa base layer, the second base layer was substituted with an AlRu base layer, and a CrMo base layer was provided as the third base layer between the second base layer and the magnetic layer.

Thus, the magnetic disk employing the in-plane magnetic recording method was manufactured. The same glass substrate for a magnetic disk, and the same magnetic disk manufactured by the same manufacturing method as the example 1 were shown except for these points. An HDD mounting test was performed regarding the obtained magnetic disk, and the same appropriate results as with the example 1 were obtained. Next, the magnetic anisotropy of the magnetic disk was surveyed. Specifically, coercive force (Hc1) in the circumferential direction of the magnetic disk and coercive force (Hc2) in the radius direction were measured, and Hc1/Hc2 was evaluated as a magnetic anisotropy index (OR). Measurement of coercive force was performed using the magnetic properties evaluation method with a VSM (vibration sampling-type magnetization measuring device). At this time, the maximum application external magnetic field was set to 8 kOe. Consequently, the OR was provided with 1.2 or so. This means that this magnetic disk was distinguished by 20% in the magnetic properties (coercive force in this case) in the circumferential direction as to those in the radius direction.

While the present invention has thus far been described in conjunction with a few examples thereof, it will be readily possible for those skilled in the art to put the present invention into practice in various other manners. For example, the present invention may be applied to each end surface of the glass substrate. In other words, the post-cleaning process according to the present invention may be not only applied to the principal surface but also each end surface of the glass substrate. More specifically, the polishing agent tends to be left on the end surface also and is difficult to be removed from the end surface because the end surface is roughened in comparison with the principal surfaces. In addition, even when no polishing process is carried out on the principal surfaces, the grinding agent is often left on the end surface. At any rate, the post-cleaning process is very effective to remove any remnant from the end surface when the post-cleaning process is executed on the end surface of the glass substrate. With this method, it is possible to prevent occurrence of any dust from the end surface and therefore to avoid thermal asperity. This method is especially effective when the glass substrate has a small diameter equal to or less than 7 mm. This is because such a small glass substrate has an inner hole of a very small inner diameter so that cleaning becomes difficult and adhesion of the polishing agent is unavoidable on the end surface which defines the inner hole. The post-cleaning process according to the present invention enables to remove the polishing agent from the end surface. In this event, the present invention depends on a surface roughness of the end surface of the glass substrate. However, the present invention is effective when the surface roughness Ra of the end surface may be equal to or less than 1 micron meter and may be preferably equal to or less than 0.5 micron meter, more preferably equal to or less than 0.05 micron meter. In addition, the end surface may be preferably subjected to the mirror polishing process.

What is claimed is:

1. A method for manufacturing a glass substrate for a magnetic disk and comprising a mirror polishing process of a glass substrate and a cleaning process of the glass substrate;

wherein the mirror polishing process comprises the steps of:

applying, on the glass substrate, a polishing agent which includes rare-earth oxide as a main component and 5% or less of fluorine by weight; and mirror polishing the surface of said glass substrate by relatively moving a polishing cloth and said glass substrate, the cleaning process comprising the steps of:

contacting the glass substrate subjected to the mirror polishing step with a cleaning solution which includes ascorbic acid, fluorine ion, and 3% by weight or more of sulfuric acid; and removing said polishing agent from the glass substrate by dissolving the polishing agent in the cleaning solution.

2. The method for manufacturing a glass substrate for a magnetic disk according to claim 1, wherein said glass substrate is formed by amorphous aluminosilicate glass which includes, by weight, 58% to 75% of $SiO_2$, 5% to 23% of $Al_2O_3$, 3% to 10% of $Li_2O$, and 4% to 13% of $Na_2O$, as principal components.

3. The method for manufacturing a glass substrate for a magnetic disk according to claim 1, wherein the content of the fluorine ion included in said cleaning solution falls within a range between 1 ppm and 40 ppm.

4. The method for manufacturing a glass substrate for a magnetic disk according to claim 3, wherein said glass substrate is formed by amorphous aluminosilicate glass which includes, by weight, 58% to 75% of $SiO_2$, 5% to 23% of $Al_2O_3$, 3% to 10% of $Li_2O$, and 4% to 13% of $Na_2O$, as principal components.

5. The method for manufacturing a glass substrate for a magnetic disk according to claim 1, wherein the concentration of the ascorbic acid included in said cleaning solution is 0.1% by weight or more.

6. The method for manufacturing a glass substrate for a magnetic disk according to claim 5, wherein said glass substrate is formed by amorphous aluminosilicate glass which includes, by weight, 58% to 75% of $SiO_2$, 5% to 23% of $Al_2O_3$, 3% to 10% of $Li_2O$, and 4% to 13% of $Na_2O$, as principal components.

7. The method for manufacturing a glass substrate for a magnetic disk according to claim 5, wherein the content of the fluorine ion included in said cleaning solution falls within a range between 1 ppm and 40 ppm.

8. The method for manufacturing a glass substrate for a magnetic disk according to claim 7, wherein said glass substrate is formed by amorphous aluminosilicate glass which includes, by weight, 58% to 75% of $SiO_2$, 5% to 23% of $Al_2O_3$, 3% to 10% of $Li_2O$, and 4% to 13% of $Na_2O$, as principal components.

9. The method for manufacturing a glass substrate for a magnetic disk according to any one of claims 1 through 8, wherein the surface of said glass substrate after said cleaning process has a mirror surface of which the maximum valley depth Rv is 4 nm or less.

10. A method for manufacturing a magnetic disk wherein at least a magnetic layer is formed on the glass substrate manufactured by the method for manufacturing the magnetic disk according to any one of claims 1 through 8.

11. The method for manufacturing a magnetic disk according to claim 10, wherein a magnetic disk for recording and reproducing information has bit recording density of 60 gigabits/$inch^2$ or more.

12. The method as claimed in claim 1, wherein the cleaning process is executed on at least one surface of principal and end surfaces of the glass substrate so as to dissolve the polishing agent on the at least one surface.

13. The method claimed in claim 1, wherein the mirror polishing step is carried out not only about the surface of the glass substrate but also an end surface of the glass substrate;
the end surface and the surface of the glass substrate being contacted with the cleaning solution to dissolve and remove the polishing agent in the removing step.

14. A method for manufacturing a glass substrate for a magnetic disk and comprising a mirror polishing process of the glass substrate and a cleaning process of the glass substrate, wherein the mirror polishing process comprises the steps of:

applying, on the glass substrate, a polishing agent which includes rare-earth oxide as a main component of 5% or less of fluorine by weight; and mirror polishing the surface of said glass substrate by relatively moving a polishing cloth and said glass substrate;

the cleaning process comprising the steps of:

contacting the glass substrate subjected to the mirror polishing step with a cleaning solution which includes ascorbic acid, fluorine ion, and 3% by weight or more of sulfuric acid; and removing said polishing agent from the glass substrate by dissolving the polishing agent in the cleaning solution without causing any recessed shaped faults to occur on the surface of the glass substrate due to the cleaning solution.

* * * * *